US005628304A

United States Patent [19]
Freiman

[11] Patent Number: 5,628,304
[45] Date of Patent: May 13, 1997

[54] SELF-HEATING CONTAINER

[75] Inventor: Robert Freiman, Thornhill, Canada

[73] Assignee: G & S Regal Trading Corporation, Concord, Canada

[21] Appl. No.: 493,585

[22] Filed: Jun. 22, 1995

[51] Int. Cl.$^6$ ............................ F24J 1/00; F24J 3/00
[52] U.S. Cl. ...................... 126/263.09; 126/263.05; 126/263.06
[58] Field of Search ................. 126/263.1, 263.05, 126/263.06, 263.07, 263.08, 262, 263.09

[56] References Cited

U.S. PATENT DOCUMENTS

| | | | |
|---|---|---|---|
| 2,300,793 | 11/1942 | Martin | 126/263 |
| 2,623,515 | 12/1952 | Sukacev | 126/263.05 |
| 3,213,932 | 10/1965 | Gottfurcht et al. . | |
| 3,561,424 | 2/1971 | Failla | 126/262 |
| 3,675,637 | 7/1972 | Trimble | 126/262 |
| 3,685,507 | 8/1972 | Donnelly . | |
| 3,970,068 | 7/1976 | Sato . | |
| 4,528,218 | 7/1985 | Maione . | |
| 4,559,921 | 12/1985 | Benmussa . | |
| 4,640,264 | 2/1987 | Yamaguchi et al. | 126/263.06 |
| 4,768,354 | 9/1988 | Barnwell . | |
| 4,771,761 | 9/1988 | Doukhan et al. . | |
| 4,773,389 | 9/1988 | Hamasaki | 126/262 |
| 4,793,323 | 12/1988 | Guida et al. . | |
| 4,809,673 | 3/1989 | Charvin . | |
| 5,220,909 | 6/1993 | Pickard et al. . | |
| 5,255,812 | 10/1993 | Hsu | 126/263.01 |
| 5,388,565 | 2/1995 | Ou | 126/262 |
| 5,461,867 | 10/1995 | Scudder et al. | 126/263.1 |

*Primary Examiner*—Carl D. Price
*Attorney, Agent, or Firm*—Marcelo K. Sarkis; Ivor M. Hughes; Neil H. Hughes

[57] ABSTRACT

A self heating container for heating a comestible item; said container being substantially recyclable, said container comprising a first chamber having one frangible wall, a second chamber, said first and second chambers being matingly attached to each other adjacent the frangible wall, said first chamber having a predetermined amount of water contained therein and said second chamber having a predetermined amount of substantially anhydrous calcium chloride contained therein; a cutting device proximate said frangible wall; to cut said frangible wall to allow contacting of the water with the substantially anhydrous calcium chloride resulting in an exothermic reaction;

said second chamber further comprising at least one comestible receptacle receiving area;

said first chamber and said second chamber being totally sealed from contact with said comestible receptacle, whereupon after use of said self heating container, said first and second chambers and said comestible receptacle are detachable and available for recycling.

46 Claims, 2 Drawing Sheets

SELF-HEATING CONTAINER

FIELD OF INVENTION

This invention relates to a self-heating container.

BACKGROUND OF THE INVENTION

This invention relates to improvements in portable self-heating containers for heating comestible items such as liquids, beverages, soups and the like without the necessary use of an external heat source such as a stove, a microwave oven, a campfire or the like. Self-heating containers find useful application in instances where the above-mentioned external heat sources are not available or are not conducive to the environment or situation, such as camping, hiking, picnicking in a car, a boat, a plane, a train, on a playing field, at a sports stadium or in any remote area distant from an external heat source. There may also be instances where for example at a time of crises or conflict, the making or using of a campfire to heat up comestible items may be unsafe and thus this self-heating container finds an application. There have been many self heating units proposed in the prior art. Several patent references are listed as follows:

U.S. Pat. No. 3,685,507 to Donnelly issued Aug. 22, 1972;

U.S. Pat. No. 4,559,921 to Benmussa issued Dec. 24, 1985;

U.S. Pat. No. 4,771,761 to Doukhan, et al. issued Sep. 20, 1988;

U.S. Pat. No. 4,768,354 to Barnwell issued Sep. 6, 1988;

U.S. Pat. No. 4,809,673 to Charvin issued Mar. 7, 1989;

U.S. Pat. No. 5,220,909 to Pickard, et al. issued Jun. 22, 1993;

U.S. Pat. No. 3,675,637 to Trimble issued Jul. 11, 1972;

U.S. Pat. No. 4,793,323 to Guida, et al. issued Dec. 27, 1988;

Foreign Reference, Great Britain—Patent Specification 1,455,188 published Nov. 10, 1976 to Sato.

Several drawbacks encountered by the applicant in the prior art include inefficient heating of the comestible item, lengthy time period in order to have the comestible item reach an acceptable temperature: several prior art self heating containers have a container made up of several different materials (such as a metal and a plastic) that are fused and/or clenched together thus making the container not readably disposable as a recyclable item. The separate containers housing the various reactants in the prior art have also been fused together with the food holding container, thus the prior art container has a characteristic that is not again conducive to recyclability. The prior art self heating containers also expose the receptacle which holds the comestible liquid or beverage or item to at least one of the reactants producing the exothermic reaction, thus increasing the probability of an accident by the user by possibly burning himself or herself in the process of heating the comestible item or by ingesting the reactants.

It is therefore an object of the invention to provide a self heating container which is highly efficient in providing heat transference from the reactants container to the comestible container. It is also another object of the invention to provide a self heating container which minimizes the risk of accident to the user upon heating said comestible item and drinking same. It is yet a further object of the invention to provide a self heating container which is environment friendly such that various components of the container can be recycled. It is still a further object of the invention to provide a self heating container where the chemical reactants do not come in contact with the comestible container.

Further, and other objects of the invention will become readily apparent to a person skilled in the art in reading the following specification, summary of the invention and detailed description of the invention describing several embodiments.

SUMMARY OF THE INVENTION

According to one aspect of the invention, there is provided a self heating container for heating a comestible item said container comprising a first chamber configured of a material with a predetermined effective thermal conductivity and preferably substantially recyclable having at least one frangible wall, a second chamber having a first end and a second end configured of a material with a predetermined effective thermal conductivity and preferably substantially recyclable, said first and second chambers being matingly and in one embodiment removably attached to each other adjacent the frangible wall of the first chamber and the first end of the second chamber, said first chamber having a first reactant contained therein and said second chamber having a second reactant contained therein; a cutting device proximate said at least one frangible wall of the first chamber to cut said at least one frangible wall to allow contacting of the first reactant with the second reactant resulting in an exothermic reaction;

said second chamber further comprising at least one comestible receptacle receiving area proximate said second end to matingly and preferably removably receive at least one comestible receptacle, said at least one comestible receptacle receiving area having a substantially optimal heat transfer configuration to allow optimal heat transfer from said second chamber to said comestible receptacle;

preferably in one embodiment a seal to seal the comestible receptacle, said seal preferably being substantially insulative and preferably substantially recyclable, preferably in another embodiment a substantially insulative portion attached to said self heating container in a configuration which substantially optimizes the heat transference from said first and second chambers to said comestible receptacle, and substantially increase the comfort level of a user holding said self heating container; preferably, said insulative portion being substantially recyclable; preferably said first chamber and said second chamber being substantially totally sealed from contact with said comestible receptacle, and preferably after use of said self-heating container, said first and second chambers, and said comestible receptacle are detachable and available for recycling.

According to another aspect of the invention, there is provided for use with a comestible receptacle to be heated a self-heating container for heating a comestible item said container comprising a first chamber made of a material with a predetermined thermal conductivity and preferably substantially recyclable having at least one frangible wall, a second chamber having a first end and a second end, said second chamber made of a material with a predetermined thermal conductivity and preferably substantially recyclable, said first and second chambers being matingly and in one embodiment removably attached to each other adjacent the frangible wall of the first chamber and the first end of the second chamber, said first chamber having a first reactant contained therein and said second chamber having a second reactant contained therein; a cutting device proximate said at least one frangible wall of the first chamber, to cut said one frangible wall to allow contacting of the first reactant with the second reactant resulting in an exothermic reaction;

said second chamber further comprising at least one comestible receptacle receiving area proximate said second end to matingly and preferably removably receive at least one comestible receptacle, said at least one comestible receptacle receiving area having a substantially optimal heat transfer configuration to allow substantially optimal heat transfer from said first and second chambers to said comestible receptacle;

preferably in one embodiment a seal to seal the comestible receptacle; said seal preferably being insulative and preferably substantially recyclable.

In another embodiment said substantially insulative wall is attached to said self-heating container in a configuration which substantially optimizes the heat transference from said first and second chambers containing the reactants to said comestible receptacle, and substantially increase the comfort level of a user holding said self heating container; preferably said insulative wall is substantially recyclable; preferably said first chamber and said second chamber being totally sealed from contact with said comestible receptacle, and preferably after use of said self-heating container, said first and second chambers, and said comestible receptacle are detachable and available for recycling.

According to another aspect of the invention, there is provided a method of using a self-heating container for heating a comestible receptacle preferably sealed, made of a recyclable material and having a predetermined thermal conductivity, and preferably having a shape that is conducive to substantially optimal heat transference thereto, containing a comestible item to be heated, said method comprising inserting a comestible receptacle into a self-heating container having a first chamber made of a material with a predetermined thermal conductivity having at least one frangible wall; a second chamber made of a material with a predetermined thermal conductivity; said first chamber and said second chamber also made of a material that is recyclable, said first and second chambers being matingly attached to each other adjacent the frangible wall, said first chamber having a first reactant contained therein and said second chamber having a second reactant contained therein;

a cutting device proximate said at least one frangible wall of the first chamber; said second chamber further comprising at least one comestible receptacle receiving area to matingly receive said comestible receptacle; said comestible receiving area having a shape that is conducive to optimal heat transfer to said comestible receptacle;

preferably an insulative wall attached to said self-heating container to substantially optimize the heat transference from the chambers containing the reactants to the comestible receptacle, and to substantially increase the comfort level of a user, said method comprising i) inserting a comestible receptacle into the comestible receptacle receiving area in a matingly manner;

ii) actuating said cutting device thus cutting said at least one frangible wall of said first chamber causing said first reactant and said second reactant to mix and react exothermically;

iii) preferably substantially shaking said self-heating container to substantially optimize the mixing of said first and second reactants and thus optimize the exothermic reaction;

iv) allowing sufficient time for the heat transference from said chambers containing the reactants to the comestible receptacle to substantially raise the temperature of the comestible item in the comestible receptacle;

v) removing said comestible receptacle seal; and vi) ingesting the contents thereof; and preferably persons carrying out the method, also vii) remove said comestible receptacle from said comestible receptacle receiving area; and viii) dispose of said comestible receptacle, said first chamber and said second chamber in the appropriate recycle area.

According to yet another aspect of the invention there is provided a self heating recyclable container for heating a comestible liquid/beverage receptacle, said container comprising a first substantially double-walled cup-like chamber, wherein the double-walls form a chamber of a predetermined volume having therein a predetermined amount of a first reactant, preferably substantially anhydrous calcium chloride, and forms an exterior cup-like cavity to house a comestible liquid/beverage receptacle;

a second sealed chamber having therein a predetermined amount of a second reactant preferably water preferably distilled and further having at least one frangible area;

said first and second chambers being removably and matingly attached to each other respectively, preferably being pressure fitted to each other, in another embodiment, being threaded to each other;

said sealed chamber further comprising a cutting device proximate to at least one frangible area of said sealed chamber, said cutting device being capable of cutting said at least frangible area of said first chamber to allow mixing of said water with said substantially anhydrous calcium chloride resulting in an exothermic reaction and thus heating said comestible liquid/beverage receptacle, a seal to seal said comestible liquid/beverage receptacle comestible liquid/beverage receptacle in said comestible liquid/beverage receptacle in the exterior cup-like cavity whilst being stored and/or heated;

said self-heating recyclable container further comprising an insulative label affixed to the outermost wall of said container to optimize the heat transfer from said chambers containing the reactants to said comestible liquid beverage receptacle and to substantially increase the comfort level of a user holding said container;

said reactants being totally sealed from physical contact with the comestible liquid/beverage receptacle and thus as well from the comestible liquid/beverage;

whereupon after use, said to comestible liquid/beverage receptacle, and said chambers contains the reactants in one embodiment; (said first chamber, and said second chamber) are detachable from each other and recyclable.

In a preferred embodiment of any of the preceding aspects of the invention, said first chamber and second chamber are preferably attached to each other in one instance via matingly cooperating threads, and in another instance via a pressure fit or the like.

In yet another preferred embodiment of any of the preceding aspects of the invention, said at least one comestible receptacle receiving areas substantially optimal heat configuration is substantially corrugated-like in shape.

In yet another preferred embodiment, said comestible receptacle is substantially corrugated-like in shape to matingly fit in said comestible receptacle receiving area. In one embodiment, said comestible receptacle is made of a material having a predetermined thermal conductivity and substantially recyclable, for example a metal such as thinsteel. Preferably, said comestible receptacle further comprises a detent to aid in the removal thereof from said comestible receptacle receiving area.

In yet another preferred embodiment, said first chamber and second chamber are colour coded dependent on the type of comestible to be heated.

In yet another embodiment, there further includes in said chamber housing the reactant, an agent to aid in the acceleration and optimization of the exothermic reaction. In a preferred embodiment said agent is substantially inert, and preferably recyclable.

In yet another preferred embodiment, said agent is the at least first frangible membrane, where upon cutting or breaking thereof, the membrane substantially breaks into substantially small pieces or fragments which aid in preventing agglomeration and substantially optimizes the mixing of the reactants, thus accelerating the reaction. In this instance, the frangible membrane could have stress areas or fracture lines thereon wherein upon breaking or cutting thereof, the membrane breaks into substantially small pieces or fragments.

In yet another preferred embodiment said second chamber proximate said receiving area for said first chamber, further comprises at least one protrusion to aid in the securement of said first chamber to said second chamber.

In yet another embodiment, said first chamber and said second chamber are made of substantially the same material such as plastic and preferably polypropylene.

In various embodiments said first chamber and said second chamber are fused together, clenched together or integrally attached to each other.

In one embodiment, said first reactant is substantially water, preferably substantially distilled water and even more preferred substantially deionized water.

In one embodiment, said second reactant is substantially a reactant which behaves exothermically upon contact with said first reactant. Preferably said second reactant being calcium chloride, and more preferably substantially anhydrous calcium chloride.

In one embodiment, the abovementioned cutting device is substantially serrated in one instance or crosslike, dependent on the configuration of the frangible membrane.

In one embodiment, said second chamber further comprises a detent or shoulder to aid in the water tight fit of said first chamber with said second chamber. Preferably said second chamber further comprises at least one detent or protrusion. Preferably said second chamber proximate the bottom thereof is substantially tapered in an outward direction to aid in the fitting of said first chamber.

According to yet another aspect of the invention, there is provided a self heating container for heating a comestible item; said container comprising a first chamber made of substantially polypropylene being substantially recyclable having one frangible wall, a second chamber having a first end and a second end, said second chamber made of substantially polypropylene being substantially recyclable, said first and second chambers being matingly attached to each other adjacent the frangible wall of the first chamber and the first end of the second chamber by a substantial pressure fit, said first chamber having a predetermined amount of water contained therein and said second chamber having a predetermined amount of substantially anhydrous calcium chloride contained therein; a cutting device proximate said at least one frangible wall of the first chamber; to cut said at least one frangible wall to allow contacting of the water with the substantially anhydrous calcium chloride resulting in an exothermic reaction;

said second chamber further comprising at least one comestible receptacle receiving area proximate said second end to matingly and removably receive at least one comestible receptacle, said at least one comestible receptacle receiving area having a substantially corrugated configuration to allow substantial optimal heat transfer from said first and second chambers to said comestible receptacle;

a substantially insulative seal to seal the comestible receptacle; said comestible receptacle being made of a substantially recyclable metal and substantially corrugated to be matingly received in said receiving area;

said frangible wall having a series of stress lines and/or fracture lines allowing said frangible wall when cut or broken to form pieces or fragments to aid in the mixing of the water and the anhydrous calcium chloride;

a substantially insulative label attached to said self heating container to substantially optimize the heat transference from said first and second chambers to said comestible receptacle, and substantially increase the comfort level of a user holding said self heating container;

said first chamber and said second chamber being totally sealed from contact with said comestible receptacle, whereupon after use of said self heating container, said first and second chambers and said comestible receptacle are detachable and available for recycling.

In another embodiment said self-heating container can be used without a comestible receptacle, wherein this embodiment said comestible receptacle receiving area is the comestible receptacle to receive the comestible item.

In regards to the choice of reactants, although calcium chloride anhydrous is preferred and water are disclosed herein, any reactants resulting in an exothermic reaction appropriate for the purposes of the above and within the spirit of the invention will suffice.

DESCRIPTION OF THE DRAWINGS

Figure 1:
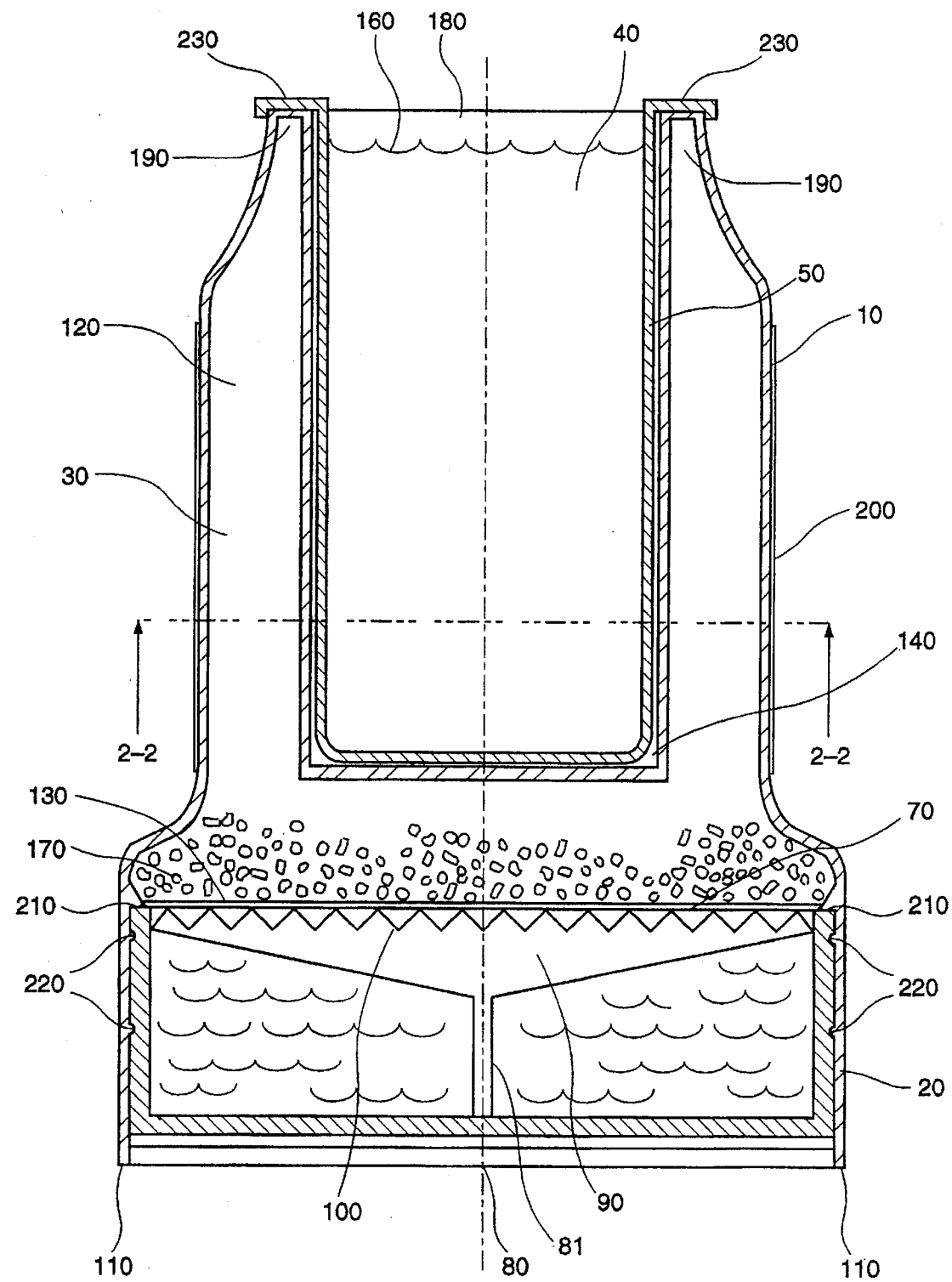
FIG. 1 is a longitudinal cross-sectional view of an embodiment of the self-heating container in accordance with the present invention.
Figure 2:
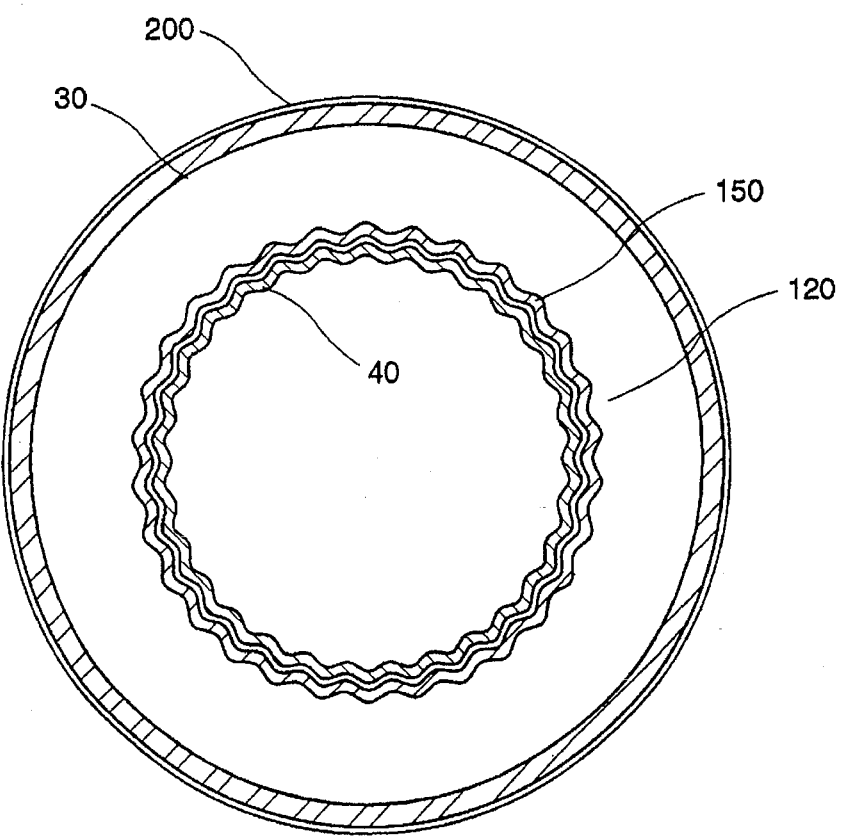
FIG. 2 is a vertical cross-sectional view of FIG. 1 taken along the line 2—2, looking up to the mouth of the self-heating container.

Referring now the Figures, there is shown a preferred embodiment of a self-heating container generally designated as 10 comprising a first chamber 20, a second chamber 30 disposed above the first chamber 20. The second chamber 30 supports a comestible receptacle 40 in a comestible receptacle receiving area 50.

In regards to the first chamber 20, in this preferred embodiment, the first chamber 20 has a general disk like shape, containing therein a predetermined amount of water 60. The first chamber is sealed at one end by a first frangible membrane 70, in order to prevent the unwanted escape of the water 60 from the first chamber 20. Coming up from the bottom 80 of the first chamber 20 is a serrated cutting device 90 with the serrated edge 100 sitting just below the first membrane 70. The bottom 80 of the first chamber 20 has a certain degree of flexibility to allow, upon applying outside pressure to the bottom thereof, for the serrated cutting device 90 and thus the serrated edge 100 thereof to cut through the first frangible membrane 70.

In regards to the second chamber 30, in this preferred embodiment, the second chamber has a general cup-like shape of a double-wall configuration forming an annular inner chamber 120. The outer wall of said second chamber 30 forms a cavity 140 to receive a comestible receptacle 160. Said cavity 140 in this preferred embodiment, the wall thereof is substantially a corrugated wall 150. The cavity 140 receives a comestible receptacle 160, said comestible receptacle 160 also being corrugated and configured to matingly fit into said cavity 140 in a snug manner in order to maximize the surface area contact, which in turn aids in the optimization of heat transference to the comestible receptacle 160. The annular inner chamber 120 contains in this preferred embodiment a predetermined amount of substantially anhydrous calcium chloride 170.

An insulative seal 180 which seals the comestible receptacle 160 with the second chamber 30 is also provided. This seal 180 can seal just the comestible receptacle 160 along the rim or detent 230 thereof, or it can seal the receptacle 180 as well as the lip 190 of the second chamber 30. The rim or detent 230 aids in the removal of the receptacle 160 from the receiving area 50. The walls forming the annular inner chamber 120 taper slightly inwards to provide an appropriate lip 190 to allow a user to easily drink from said receptacle 40.

The second chamber 30 is matingly attached to said first chamber 20 via a pressure fit resulting in a substantially water tight fit. As can be seen from FIG. 1, the second chamber 30 has a detent or shoulder 210 in order for the first chamber 20 to sit in a water-tight manner with said second chamber 30. Furthermore, in this embodiment there are shown two protrusions 220 proximate the detent 210, to aid in the water tight fit of said first chamber 20 into said second chamber 30. Also, along the bottom inside periphery of the first chamber 20 there is a skirt 110 to aid in the stabilization of the self-heating container 10. In this embodiment, the skirt 110 of the second chamber 30 is slightly tapered outwards to the bottom, although difficult to see in the Figures, to receive the first chamber 20 resulting in a pressure fit for a water tight seal. Prior to attaching both chambers in a preferred embodiment the first chamber 20 is filled with a predetermined amount of water 60, and the first chamber 20 is then sealed with a first frangible membrane 70.

The second chamber 30 is turned upside down so that the annular inner chamber 120 is filled with a predetermined amount of preferably anhydrous calcium chloride 170. In one embodiment, the second chamber 30 can be sealed with a second frangible membrane 130, and then the first sealed chamber 20 and the second sealed chamber 30 are attached to each other by a pressure fit or the like. In a variation of the above, the second chamber 30 need not be sealed, but is kept in a manner to disallow any spillage of the anhydrous calcium chloride 170, and the first sealed chamber 20 is then matingly attached to the second chamber 30 in order to provide a watertight seal forming the self-heating container 10. The self-heating container 10 is also provided with a thermal insulative label 200 which fits snugly around the periphery of the self-heating container 10 in order to aid in keeping the heat of reaction within the container itself and also to increase the comfort level of the consumer when holding their self-heating container 10.

Now the self-heating container 10 is ready to receive a comestible receptacle 160. This receptacle 160 can contain any beverage, food, or liquid that is preferred warm or hot in order to be consumed. A preferred beverage is coffee or tea. A preferred volume capacity of the comestible receptacle 160 is about 150 ml, but other volume capacities can be made available depending on the needs of the consumer.

The comestible receptacle 160 is corrugated along the length thereof to fit in matingly association with the corrugated wall 150 of the cavity 140.

In use, the consumer turns the self-heating container 10 upside down so that the first chamber 20 is above the second chamber 30. Depressing the bottom 80 with projecting rib 81 of the first chamber 20, the projecting rib 81 for engaging the serrated cutting device causes the serrated cutting device 90 and in turn the serrated edge 100 to cut through the first frangible membrane 70, and depending on which variation, the second frangible membrane 130 as well, releasing the water 60 into the second chamber 30, allowing the water 60 and the anhydrous calcium oxide 170 to mix and thus react exothermically. The consumer can turn the self-heating container 120 right side up now and shake it in a up-down motion or side to side motion or in any manner which increases the mixing of the water 60 and the anhydrous calcium chloride 170. After a predetermined period of time depending on the comestible item and desired temperature, the comestible item will be heated up due to the heat transfer occurring from the first and second chambers (20, 30) to the comestible receptacle 40 and in turn the comestible item 160. At this point, the consumer removes the removable seal 180 and consumes the comestible item 160. Upon termination of consumption, the comestible receptacle 40 is removed by the consumer from the comestible receptacle receiving area 50 and placed in the appropriate recycle area, and the self-heating container 10 specifically chambers 20 and 30 is also placed in the appropriate area for recycling.

Several examples of selection of materials that are conducive to recycling and also suitable for the performance of the self-heating container 10 are as follows:

The first and second chambers (20 and 30) are preferably comprised of a plastic material which will ensure stability during process while maintaining dimensional integrity and safety during the use thereof. A preferred plastic is polypropylene. Additives may be further incorporated for further stability and colouring. Colouring of the chambers can be incorporated to facilitate storage thereof, ease of identification of various ratios of water to calcium chloride dependent on the comestible to be heated, and the temperature requirements.

Figure 3:
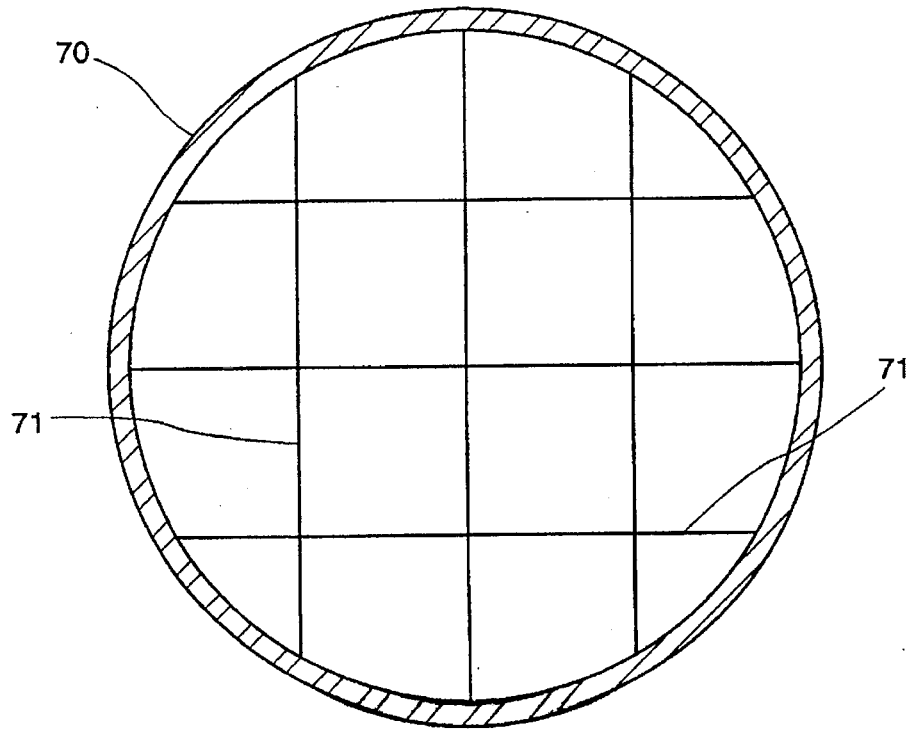
FIG. 3 is a top view of the frangible membrane showing the stress lines and/or fracture lines.

In regards to the first membrane 70 and optionally the second membrane 130 the choice of material must include properties such as easily frangible, yet water proof, in order to allow maximum mixing of water with the calcium chloride and yet prevent an unwanted reaction between the water and the calcium chloride. In one embodiment the first membrane and optionally, but not necessary, second membrane choice of material is cast polypropylene CPP, with a thickness of about between 0.010–0.005 mm. This material is strong enough to contain the water when not being reacted, and yet has a property, when stress or fracture lines are contained therein to break into fragments and act as an agent to enhance mixing of the reactants. This can be seen in FIG. 3 where the frangible member 70 has a series of stress and/or fracture lines 71, such that when the cutting device 90 makes contact with the membrane 70, the membrane 70 will break into small fragments aiding in the mixing of the reactants.

Furthermore, the serrated cutting device 80 is preferably an integral part of the first chamber 20.

In regards to the comestible receptacle 40, the selection of material shall be one which has good thermal conductive properties in order to readily accept the heat transfer from the first and second chambers (20, 30) through to the comestible item 160 to be heated, and the material should be recyclable. In one example, the comestible receptacle 40 is made of thin steel with the seal 180 made of a similar material clinched to the receptacle 40. The seal 180 in this case would preferably be comprised of a aluminum foil polyethylene laminate, or alternatively cast polypropylene.

In regards to the choice of water 60 the most preferred choice is deionised water, however distilled water or plain tap water will also suffice.

In regards to the choice of the calcium chloride bead form is preferred, and also anhydrous calcium chloride is preferred due to its high heat of solution per unit mass. Furthermore, the low price, commercial availability and its low acute oral toxicity similar to table salt. Furthermore, an additive preferably inert to prevent agglomeration of the calcium chloride and thus optimize the mixing and reacting with the water can also be added, such as plastic beads, made of preferably the same material as the first and second chambers (20, 30). In the instance where there is an agent to aid in the mix of reactants, a preferred embodiment is having the first membrane 70 having a series of stress or fracture lines where upon breaking thereof, the membrane breaks into small pieces or fragments and now aids in the mixing of the reactants.

In regards to the ratio of water to anhydrous calcium chloride the respective proportions will be dictated by the type and amount of comestible item and the desired temperature of consumption.

The selection of material is such so as to provide upon termination of use thereof a self-heating container 10 that is environmentally friendly in the sense that the unit can be recycled where available through minimizing waste.

In the manufacturing and preparation of the first chamber 20, the second chamber 30, and the comestible receptacle 40 the aspect that each can be prepared and manufactured separately (specifically the first chamber 20 and the second chamber 30 separate from the comestible receptacle 40) reduces the possibility of cross-contamination, and also the comestible receptacle 40 can be filled with the comestible item 160 at an appropriate time, for example just prior to shipping, depending on the demand, thus increasing the shelf life of the unit as a whole.

In regards to the thermal insulative label 200, it too can be colour-coded dependent on the comestible receptacle 40 to be used with the self-heating container 10.

The following are test results of various self heating containers during the experimental stage

TEST SERIES #1

Equipment

Simulating water chamber A1 is a styrofoam rectangular container.
Simulating chemical chamber A2 is a 500 ml glass jar.
Simulating the container B (containing beverage) is a 355 ml empty aluminum soft drink can.
Simulating the beverage is water.

Test 1

Initial Testing Conditions

Beverage quantity is 150 ml.
Beverage temperature is 18.4 deg. C.
Water quantity in A1 is 150 ml.
Water temperature in A1 is 18.4 deg. C.
Calcium Chloride quantity is 110 gr.

Method

Pour the water onto the Calcium Chloride and mix with a glass thermometer.
Read temperatures as a function of time in the simulated A2 glass jar.

Results

| Time (seconds) | Degrees C. (in glass jar) |
|---|---|
| 0 | 18.4 |
| 5 | 19.3 |
| 15 | 20.8 |
| 30 | 25 |
| 35 | 28 |
| 60 | 38 |
| 65 | 40 |
| 90 | 47.2 |
| 120 | 52 |
| 180 | 56 |

Test 2

Initial Testing Conditions

Beverage quantity is 150 ml.
Beverage temperature is 18.4 deg. C.
Water quantity in A1 is 150 ml.
Water temperature in A1 is 18.2 deg. C.
Calcium Chloride quantity is 110 gr.

Method

Same as above except insulated glass jar sides, bottom and top lid with approximately ¼" foam pad.

Results

| Time (seconds) | Degrees C. (in glass jar) |
|---|---|
| 45 | 22.6 |
| 60 | 26 |
| 90 | 32 |
| 120 | 36 |
| 150 | 46 |
| 180 | 50 |
| 200 | 52.5 |
| 210 | 53.4 |
| 240 | 54 |

Test 3

Initial Testing Conditions

Beverage quantity is 0 ml.
Beverage temperature is n/a deg. C.
Water quantity in A1 is 150 ml.
Water temperature in A1 is 17.8 deg. C.
Calcium Chloride quantity is 110 gr.

Method

Container A simulated by a fully capped glass bottle wrapped all around with insulated foam pad.
Weight of glass and cap 180 gr.
Pour water onto Calcium Chloride contained in bottle, close cap and shake vigorously for 1 (one) minute.

Results

Reached temperature of 85 degrees C.

Test 4

Initial Testing Conditions

Beverage quantity is 0 ml.
Beverage temperature is n/a deg. C.
Water quantity in A1 is 150 ml.
Water temperature in A1 is 8.5 deg. C.

Method

Same as test 3.

Results

Reached temperature of 76 degrees C.

TEST SERIES #2

Equipment

Simulating water chamber A1 is a styrofoam rectangular container.
Simulating chemical chamber A2 is a 500 ml glass jar.
Simulating the container B (containing beverage) is a 355 ml empty aluminum soft drink can.
Simulating the beverage is water.

Initial Testing Conditions

Beverage quantity is 150 ml.
Beverage temperature is 18 deg. C.
Water quantity in A1 is 150 ml.
Water temperature in A1 is 18 deg. C.
Calcium Chloride quantity is 150 gr.

Method

Pour the water onto the Calcium Chloride and shake lightly. Read temperatures as a function of time in the simulated A2 glass jar.

Results

| Time (minutes) | Degrees C. (in glass jar) |
| --- | --- |
| 2 | 36 |
| 3 | 38.5 |
| 4 | 42.9 |
| 5 | 49.8 |
| 6 | 52.7 |

Mixed for 50 seconds more the solution in the simulated A2 glass jar.
Temperature of the chemical solution was elevated to 58.3 degrees C.

Equipment

Simulating water chamber A1 is a styrofoam rectangular container.
Simulating chemical chamber A2 is a 500 ml glass jar.
Simulating the container B (containing beverage) is a 355 ml empty aluminum soft drink can.
Simulating the beverage is water.

Test 1

Initial Testing Conditions

Beverage quantity is 150 ml.
Beverage temperature is 17.2 deg. C.
Water quantity in A1 is 200 ml.
Water temperature in A1 is 17.2 deg. C.
Calcium Chloride in A2 is 160 grams.

Method

Pour the water onto the Calcium Chloride and shake lightly. Read temperatures as a function of time in the simulated A2 glass jar.

Results

Achieved final temperature level of 62.8 degrees C. after 3 minutes.

Test 2

Initial Testing Conditions

Beverage quantity is 0 ml.
Beverage temperature is 15.5 deg. C.
Water quantity in A1 is 350 ml.
Water temperature in A1 is 15.5 deg. C.
Calcium Chloride in A2 is 160 grams.

Method

Pour the water onto the Calcium Chloride and mix solution with thermometer.
Read temperatures as a function of time in the simulated A2 glass jar.

Results

Achieved final temperature level of 81 degrees C. in less than 2 (two) minutes.

Initial Testing Conditions

Beverage quantity is 150 ml.
Beverage temperature is 19.4 deg. C.
Water quantity in A1 is 150 ml.
Water temperature in A1 is 19.4 deg. C.
Calcium Chloride in A2 is 150 grams.

Note: This test the beverage cup shape is wavy to increase surface area.

Method

Pour the water onto the Calcium Chloride, shake assembly for 1 (one) minute and read the simulated beverage temperature.

Results

Achieved simulated beverage temperature of 62 degrees C.

Purpose of this test was to get a feel for what is the 'right' temperature of a cup of coffee. The method was to warm up an existing beverage, taste it and read the temperature of it using a thermometer.

Results

Coffee at 55 degrees C. does not 'feel' warm enough.
Coffee at 66 degrees C. 'feels' as a good warm cup of coffee.
Hot chocolate beverage at 50 degrees C. 'feels' too cold.
Hot chocolate beverage at 66.8 degrees C. 'feels' as a good warm cup.

TEST SERIES #4

Initial Testing Conditions

Beverage quantity is 150 ml.
Beverage temperature is 18.3 deg. C.
Water quantity in A1 is 150 ml.

Water temperature in A1 is 18.3 deg. C.
Calcium Chloride in A2 is 150 grams.

Can containing beverage was constructed with fins to increase surface area and find out correlation of surface area to time and rate of temperature rise. This can is a steel can (typical soft drink can) having a height of 8.2 cm and diameter of 6.6 cm. 12 (twelve) fins made of the same material having the dimensions of 8 cm, high×0.9 cm wide were glued to the outer wall of the can.

Weight of empty can with no fins is 10 grams. Weight of empty can with fins is 14 grams. The outer bath, chamber A1 has a volume of 600 ml made of polystyrene having a weight of 105 grams (c=0.18) and is insulated with 2 mm foam and has a polyethylene locking top cap.

Test 1

Can in this test is of non finned type. The Calcium Chloride in this test is 4–20 mesh C. 614 suppliers code.

Initial test conditions as per indication above.

Method

Pour the water onto the Calcium Chloride, shake assembly for 1 (one) minute and read the simulated beverage temperature.

Results

After 1 (one) minute of normal non vigorous shaking the simulated beverage temperature reached 59 degrees C. The solution temperature in A2 reached 70 degrees C.

Test 2

Initial Testing Conditions

Beverage quantity is 150 ml.
Beverage temperature is 18 deg. C.
Water quantity in A1 is 150 ml.
Water temperature in A1 is 18 deg. C.
Calcium Chloride in A2 is 150 gr.
Calcium Chloride is a mesh 20 (finer granules than in test 1).

Method

Pour the water onto the Calcium Chloride, shake assembly for 1 (one) minute and read the simulated beverage temperature.

Results

After 1 (one) minute of normal non vigorous shaking the simulated beverage temperature reached 52 degrees C. The solution temperature in A2 reached 62 degrees C. The fine mesh Calcium Chloride powder is not completely dissolved.

Test 3

Initial Testing Conditions

Beverage quantity is 150 ml.
Beverage temperature is 17.7 deg. C.
Water quantity in A1 is 150 ml.
Water temperature in A1 is 17.7 deg. C.
Calcium Chloride in A2 is 150 grams.

In this test the Calcium Chloride is C 614, 4–20 mesh. The simulated beverage container is finned as per the above details.

Method

Pour the water onto the Calcium Chloride, shake assembly for 1 (one) minute and read the simulated beverage temperature.

Results

After 1 (one) minute of normal non vigorous shaking the simulated beverage temperature reached 59 degrees C. The solution temperature in A2 reached 68 degrees C.

Note: Shaking for additional 30 (thirty) seconds resulted in simulated beverage temperature of 61 degrees C.

Test 4

Initial Testing Conditions

Beverage quantity is 150 ml
Beverage temperature is 18 deg. C.
Water quantity in A1 is 150 ml.
Water temperature in A1 is 18 deg. C.
Calcium Chloride in A2 is 150 grams.

In this test the Calcium Chloride is C 614, 4–20 mesh. The simulated beverage container is straight wall.

Method

Pour the water onto the Calcium Chloride, shake assembly for 1 (one) minute and read the simulated beverage temperature.

Results

After 1 (one) minute of normal non vigorous shaking the simulated beverage temperature reached 70 degrees C. The solution temperature in A2 reached 82 degrees C.

TEST SERIES #5

Test 1

Initial Testing Conditions

Beverage quantity is 150 ml.
Beverage temperature is 17.7 deg. C.
Water quantity in A1 is 150 ml.
Water temperature in A1 is 17.7 deg. C.
Calcium Chloride in A2 is 150 grams.

In this test the Calcium Chloride is C 614, 4–20 mesh. The simulated beverage container is straight wall.

Method

Pour the water onto the Calcium Chloride, shake assembly for 1 (one) minute and read the simulated beverage temperature.

Results

After 1 (one) minute of normal non vigorous shaking the simulated beverage temperature reached 61 degrees C. The solution temperature in A2 reached n/r (not recorded) degrees C.

Test 2

Initial Testing Conditions

Beverage quantity is 150 ml.
Beverage temperature is 29 deg. C.
Water quantity in A1 is 150 ml.

Water temperature in A1 is 29 deg. C.
Calcium Chloride in A2 is 150 grams.

In this test the Calcium Chloride is C 614, 4–20 mesh. The simulated beverage container is straight wall.

Method

Pour the water onto the Calcium Chloride, shake assembly for 1.5 (one and a half) minute and read the simulated beverage temperature.

Results

After 1.5 (one and a half) minute of normal non vigorous shaking the simulated beverage temperature reached 63 degrees C. The solution temperature in A2 reached n/r (not recorded) degrees C.

Test 3

Initial Testing Conditions

Beverage quantity is 150 ml.
Beverage temperature is 40 deg. C.
Water quantity in A1 is 150 ml.
Water temperature in A1 is 40 deg. C.
Calcium Chloride in A2 is 150 grams.

In this test the Calcium Chloride is C 614, 4–20 mesh. the simulated beverage container is straight wall.

Method

Pour the water onto the Calcium Chloride, shake assembly for 1.5 (one and a half) minute and read the simulated beverage temperature.

Results

After 1.5 (one and a half) minute of normal non vigorous shaking the simulated beverage temperature reached 67 degrees C. The solution temperature in A2 reached 77 degrees C.

Chemical Ingredients

The literature points at a number of substances that generate heat in the process of reacting or solving. This heat is equal to the variation in enthalpy H during the reaction. Conventionally the heat generated from the reaction is written with a minus sign.

Table 1 below shows a few substances and their associated solving heat:

| Substance | Kcal/mol | $\Delta H298$ Btu/lb. |
|---|---|---|
| Hydrochloric Acid HCl | −17.74 | −874.3 |
| Nitric Acid $HNO_3$ | −7.85 | −224,15 |
| Sodium Chloride NaCl | +1.02 | −31.37 |
| Sodium Sulfate Anhydrous $Na_2SO_4$ | −0.36 | −4.56 |
| Sodium Sulfate Decahydrate $Na_2SO_4 \times 10\ H_2O$ | +19.02 | +106.26 |
| Calcium Chloride Anhydrous $CaCl_2$ | −19.03 | −317.20 |
| Calcium Chloride Hexahydrate $CaCl_2 \times 6\ H_2O$ | +3.4 | — |
| Copper Sulfate CuSO4 | −16.43 | −185.3 |
| Copper Sulfate Pentahydrate $CuSO_4 \times 5\ H_2O$ | +2.42 | +17.45 |

From the heat generating view the Hydrochloric Acid appears to provide an excellent source of heat when solved (874.3 Btu/lb.) However one of the purposes of the invention that is intended to be used safely and conveniently as a self-heating container precludes the use of this substance that is highly corrosive. Same consideration applies to the second substance in table 1, Nitric Acid.

The rest of the chemicals in table 1 are ordinary salts with some requiring heat for the solution to occur (marked with a positive sign). The salts requiring heat are not suitable for the purpose of the present invention.

From all the feasible salts shown in table 1 the Calcium Chloride Anhydrous is preferred since it generates the highest heat of solving per unit of mass. However, other substances exhibiting similar properties can be used. Table 2 below shows the properties of Calcium Chloride Hydrates.

TABLE 2

| PROPERTY | Properties of Calcium Chloride Hydrates | | | | |
|---|---|---|---|---|---|
| | $CaCl_2.6H_2O$ [7774-34-7] | $CaCl_2.4H_2O$ [25094-02-4] | $CaCl_2.2H_2O$ [10035-04-8] | $CaCl_2.H_2O$ [22691-02-7] | $CaCl_2$. [10043-52-4] |
| composition, % $CaCl_2$ | 50.66 | 60.63 | 75.49 | 86.03 | 100.00 |
| mol wt. | 219.09 | 183.05 | 147.02 | 129.00 | 110.99 |
| $mp^b$, °C. | 29.9 | 45.3 | 176 | 187 | 772 |
| bp. °C. | — | — | 175 | 181 | 1935 |
| density, $d_4^{25}$ | 1.71 | 1.83 | 1.85 | 2.24 | 2.16 |
| heat of fusion J/g (Btu/lb) | 209 (90) | 163 (70) | 88 (38) | 134 (58) | 257 (111) |
| heat of soln (to infinite diln) in $H_2O$, J/g (Btu/lb) | 72 (31) | −59.4 (−25.6) | −304.6 (−131.1) | −405 (−174.3) | −737.2 (−317.2) |
| heat of formation$^d$ kJ/mols at 25° C. | −2608 | −2010 | −1404 | −1111 | −795.4 |
| heat capacity, J/(g · K)$^e$ at 25° C. | 1.4 | 1.4 | 1.2 | 0.84 | 0.67 |

As many changes can be made to the invention without departing from the scope of the invention, it is intended that all material contained herein be interpreted as illustrative of the invention and not in a limiting sense.

The embodiments of the invention in which an exclusive property or privilege is claimed are as follows:

1. A self-heating container for heating a comestible item; said container being substantially recyclable and comprising a first chamber configured of a material with a predetermined effective thermal conductivity and substantially recyclable having at least one frangible wall, a second chamber having a first end and a second end, said second chamber configured of a material with a predetermined effective thermal conductivity and being substantially recyclable, said first and second chambers being matingly attached to each other adjacent the frangible wall of the first chamber and the first end of the second chamber, said first chamber having a first reactant contained therein and said second chamber having a second reactant contained therein; a cutting device proximate said at least one frangible wall of the first chamber; to cut said at least one frangible wall to allow contacting of the first reactant with the second reactant resulting in an exothermic reaction;

said second chamber further comprising at least one comestible receptacle receiving area proximate said second end to matingly and removably receive at least one comestible receptacle, said at least one comestible receptacle receiving area having a substantially optimal heat transfer configuration to allow substantial optimal heat transfer from said first and second chambers to said comestible receptacle;

a substantially insulative seal to seal the comestible receptacle;

an insulative portion attached to said self heating container to substantially optimize the heat transference from said first and second chambers to said comestible receptacle, and substantially increase the comfort level of a user holding said self heating container;

said first chamber and said second chamber being totally sealed from contact with said comestible receptacle, whereupon after use of said self heating container, said first and second chambers and said comestible receptacle are detachable and available for recycling.

2. The container of claim 1 wherein said first chamber and said second chamber are matingly attached to each other via a pressure fit.

3. The container of claim 1 wherein said first chamber and said second chamber are matingly attached to each other via a friction fit.

4. The container of claim 1 wherein said at least one comestible receptacle receiving area's substantially optimal heat transfer configuration is substantially corrugated.

5. The container of claim 4 wherein said comestible receptacle is corrugated to matingly fit in said comestible receptacle receiving area.

6. The container of claim 1 wherein said first chamber and said second chamber are made of the substantially same material.

7. The container of claim 1 wherein said first chamber and said second chamber are fused together.

8. The container of claim 1 wherein said first chamber and said second chamber are clenched together.

9. The container of claim 1 wherein said first chamber and said second chamber are integrally attached to each other.

10. The container of claim 1 wherein said first reactant is a predetermined amount of substantially water.

11. The container of claim 1 wherein said second reactant is a predetermined amount of substantially anhydrous calcium chloride.

12. The container of claim 1 wherein said comestible receptacle is made of a material with a predetermined effective thermal conductivity and is also recyclable.

13. The container of claim 12 wherein the comestible receptacle is made substantially of a metal.

14. The container of claim 1 wherein said self heating container further comprises an agent to aid in the mixing of said reactants.

15. The container of claim 14 wherein said agent is a substantially inert recyclable material.

16. The container of claim 15 where said agent forms part of said first frangible membrane.

17. The container of claim 16 whereas said first frangible membrane further comprises stress lines and/or fracture lines allowing said frangible membrane when cut or broken to form pieces or fragments to aid in the mixing of the reactants.

18. The container of claim 1 wherein said first and second chambers and made of substantially polypropylene.

19. The container of claim 1 wherein the comestible receptacle further comprises a detent to aid in the removal thereof from said comestible receptacle receiving area.

20. The container of claim 1 wherein said first frangible membrane is made substantially of polypropylene.

21. The container of claim 1 wherein said cutting device is substantially serrated or the like.

22. For use with a comestible receptacle to be heated a self-heating container for heating a comestible item said container being substantially recyclable and comprising a first chamber made of a material with a predetermined effective thermal conductivity and substantially recyclable having at least one frangible wall, a second chamber having a first end and a second end, said second chamber made of a material with a predetermined thermal conductivity and substantially recyclable, said first and second chambers being matingly attached to each other adjacent the frangible wall of the first chamber and the first end of the second chamber, said first chamber having a first reactant contained therein and said second chamber having a second reactant contained therein; a cutting device proximate said at least one frangible wall of the first chamber, to cut said at least one frangible wall to allow contacting of the first reactant with the second reactant resulting in an exothermic reaction;

said second chamber further comprising at least one comestible receptacle receiving area proximate said second end to matingly and removably receive at least one comestible receptacle, said at least one comestible receptacle receiving area having a substantially optimal heat transfer configuration to allow substantially optimal heat transfer from said first and second chambers to said comestible receptacle;

a seal to seal the comestible receptacle;

a substantially insulative wall attached to said self heating container to substantially optimize the heat transference from said first and second chambers to said comestible receptacle, and substantially increase the comfort level of a user holding said self heating container; said first chamber and said second chamber being totally sealed from contact with said comestible receptacle, whereupon after use of said self heating container, said first and second chambers and said comestible receptacle are detachable and available for recycling.

23. The use of claim 22 wherein said first chamber and said second chamber are matingly attached to each other via a pressure fit or the like to provide a substantially water-tight arrangement.

24. The use of claim 22 wherein said first chamber and said second chamber are matingly attached to each other via a friction fit.

25. The use of claim 22 wherein said at least one comestible receptacle receiving area's substantially optimal heat transfer configuration is substantially corrugated like.

26. The use of claim 22 wherein said comestible receptacle has a corrugated-like shape to matingly fit in said comestible receptacle receiving area.

27. The use of claim 22 wherein said first chamber and said second chamber are made of the substantially same material.

28. The use of claim 22 wherein said first chamber and said second chamber are fused together.

29. The use of claim 22 wherein said first chamber and said second chamber are clenched together.

30. The use of claim 22 wherein said first chamber and said second chamber are integrally attached to each other.

31. The use of claim 22 wherein said first reactant is a predetermined amount of substantially water.

32. The container of claim 22 wherein said second reactant is a predetermined amount of substantially anhydrous calcium chloride.

33. The container of claim 22 wherein said comestible receptacle is made of a material with a predetermined effective thermal conductivity and is also recyclable.

34. The container of claim 33 wherein the comestible receptacle is made of substantially thin steel or the like.

35. The container of claim 22 wherein said self heating container further comprises an agent to aid in the mixing of said reactant.

36. The container of claim 35 wherein said agent is a substantially inert recyclable material.

37. The container of claim 36 wherein said agent forms part of said first frangible membrane.

38. The container of claim 37 wherein said first frangible membrane further comprises stress lines and/or fracture lines allowing said frangible membrane when cut or broken to form pieces to aid in the mixing of the reactants.

39. The container of claim 22 wherein said first and second chambers are made of substantially polypropylene.

40. The container of claim 22 wherein the comestible receptacle further comprises a detent to aid in the removal thereof from said comestible receptacle receiving area.

41. The container of claim 22 wherein said first frangible membrane is made substantially of polypropylene.

42. The container of claim 22 wherein said cutting device is substantially serrated or the like.

43. A method of using a self-heating container for heating a comestible receptacle configured of a substantially recyclable material and having a predetermined thermal conductivity and preferably being of a shape that is conducive to substantially optimal heat transfer thereto, comprising inserting a comestible receptacle containing a comestible item to be heated into a self-heating container being substantially recyclable, said heating container having a first chamber configured of a material with a predetermined thermal conductivity, having at least one frangible wall; a second chamber configured of a material with a predetermined thermal conductivity, said first and second chambers being matingly attached to each other adjacent the frangible wall, said first chamber having a first reactant contained therein and said second chamber having a second reactant contained therein;

a cutting device proximate said at least one frangible wall of the first chamber; said second chamber further comprising at least one comestible receptacle receiving area to matingly receive said comestible receptacle;

a substantially insulative wall attached to said self-heating container to substantially optimize the heat transference from the chambers containing the reactants to the comestible receptacle, and to substantially increase the comfort level of a user, said method comprising i) inserting a comestible receptacle into the comestible receptacle receiving area in a matingly manner;

ii) actuating said cutting device thus cutting said at least one frangible wall of said first chamber causing said first reactant and said second reactant to mix and react exothermically;

iii) substantially shaking said self-heating container to substantially optimize the mixing of said first and second reactants and thus optimize the exothermic reaction;

iv) allowing sufficient time for the heat transference from said chambers containing the reactants to the comestible receptacle to substantially raise the temperature of the comestible item in the comestible receptacle;

v) removing said comestible receptacle seal; and vi) ingesting the contents thereof; and optionally vii) removing said comestible receptacle from said comestible receptacle receiving area; and viii) disposing of said comestible receptacle, said first chamber and said second chamber in the appropriate recycle area.

44. A self-heating recyclable container for heating a comestible liquid/beverage receptacle, said container being substantially recyclable, said container comprising a first substantially double-walled cup-like chamber, wherein the double-walls form a chamber of a predetermined volume having therein a predetermined amount of substantially anhydrous calcium chloride, and also forms an exterior cup-like cavity to matingly house a comestible liquid/beverage receptacle;

a second sealed chamber having therein a predetermined amount of water and further having at least one frangible area;

said first and second chambers being matingly attached to each other respectively via a pressure or friction water tight fit;

said second sealed chamber further comprising a cutting device proximate to said at least one frangible area, said cutting device being capable of cutting said at least one frangible area of said second chamber to allow mixing of said water with said substantially anhydrous calcium chloride resulting in an exothermic reaction and thus heating said comestible liquid/beverage receptacle; a seal to seal said comestible liquid/beverage receptacle in the exterior cup-like cavity whilst being stored and/or heated;

said self-heating recyclable container further comprising an insulative label affixed to said container to optimize the heat transfer from said chambers containing the reactants to said comestible liquid/beverage receptacle and to substantially increase the comfort level of a user holding said container;

said reactants being totally sealed from physical contact with the comestible liquid/beverage receptacle and thus as well from the comestible liquid/beverage; whereupon after use, said comestible liquid/beverage receptacle, and said first and second chambers, are detachable from each other and recyclable.

45. The self-heating container of claim 1 or 22 wherein said seal to seal the comestible receptacle is substantially insulative.

46. A self heating container for heating a comestible item; said container being substantially recyclable, said container comprising a first chamber made of substantially polypropylene being substantially recyclable having one frangible wall, a second chamber having a first end and a second end, said second chamber made of substantially polypropylene being substantially recyclable, said first and second chambers being matingly attached to each other adjacent the frangible wall of the first chamber and the first end of the second chamber by a substantial pressure fit, said first chamber having a predetermined amount of water contained therein and said second chamber having a predetermined amount of substantially anhydrous calcium chloride contained therein; a cutting device proximate said at least one frangible wall of the first chamber; to cut said at least one frangible wall to allow contacting of the water with the substantially anhydrous calcium chloride resulting in an exothermic reaction;

said second chamber further comprising at least one comestible receptacle receiving area proximate said second end to matingly and removably receive at least one comestible receptacle, said at least one comestible receptacle receiving area having a substantially corrugated configuration to allow substantial optimal heat transfer from said first and second chambers to said comestible receptacle; a substantially insulative seal to seal the comestible receptacle; said comestible receptacle being made of a substantially recyclable metal and substantially corrugated to be matingly received in said receiving area;

said frangible wall having a series of stress lines and/or fracture lines allowing said frangible wall when cut or broken to form pieces or fragments to aid in the mixing of the water and the anhydrous calcium chloride;

a substantially insulative label attached to said self heating container to substantially optimize the heat transference from said first and second chambers to said comestible receptacle, and substantially increase the comfort level of a user holding said self heating container;

said first chamber and said second chamber being totally sealed from contact with said comestible receptacle, whereupon after use of said self heating container, said first and second chambers and said comestible receptacle are detachable and available for recycling.

\* \* \* \* \*